(12) United States Patent
Yanagisawa et al.

(10) Patent No.: US 7,048,904 B2
(45) Date of Patent: May 23, 2006

(54) CARBON FIBER FOR A FUEL CELL HAVING CATALYTIC METAL SUPPORTED THEREON

(75) Inventors: Takashi Yanagisawa, Tokyo (JP); Morinobu Endo, 615, Kitahara-cho, Suzaka-shi, Nagano-ken (JP)

(73) Assignees: GSI Creos Corporation, Tokyo (JP); Morinobu Endo, Suzaka (JP)

( * ) Notice: Subject to any disclaimer, the term of this patent is extended or adjusted under 35 U.S.C. 154(b) by 414 days.

(21) Appl. No.: 10/098,416

(22) Filed: Mar. 18, 2002

(65) Prior Publication Data

US 2003/0026982 A1    Feb. 6, 2003

(30) Foreign Application Priority Data

Mar. 21, 2001  (JP) .............................. 2001-081736
Aug. 29, 2001  (JP) .............................. 2001-260408
Feb. 22, 2002  (JP) .............................. 2002-046771

(51) Int. Cl.
*D01F 9/12*    (2006.01)

(52) U.S. Cl. .............................. 423/447.2; 423/447.1; 423/447.3; 428/367; 977/DIG. 1

(58) Field of Classification Search ............. 423/447.1, 423/447.2, 447.3, 445 R; 428/367
See application file for complete search history.

(56) References Cited

U.S. PATENT DOCUMENTS 5,653,951 A * 8/1997 Rodriguez et al. .......... 423/439
5,780,101 A * 7/1998 Nolan et al. ................. 427/216
6,471,936 B1 * 10/2002 Chen et al. ............... 423/658.2
6,506,355 B1 * 1/2003 Glasgow et al. ......... 423/447.3
2003/0004058 A1 * 1/2003 Li et al. ..................... 502/258

FOREIGN PATENT DOCUMENTS

EP       0198558 A2    10/1986
EP       1 122 344 A2   8/2001
WO       WO 93/24214 A1  12/1993

OTHER PUBLICATIONS

U.S. Appl. No. 10/098,375, filed Mar. 18, 2002, Yanagisawa et al.
U.S. Appl. No. 10/098,351, filed Mar. 18, 2002, Yanagisawa et al.
U.S. Appl. No. 10/098,396, filed Mar. 18, 2002, Yanagisawa et al.

(Continued)

*Primary Examiner*—Tom Dunn
*Assistant Examiner*—Peter J. Lish
(74) *Attorney, Agent, or Firm*—Oliff & Berridge, PLC

(57) ABSTRACT

A carbon fiber having catalytic metal supported thereon according to the present invention is a carbon fiber in which a number of hexagonal carbon layers in the shape of a cup having no bottom are stacked. At least part of edges of the hexagonal carbon layers is exposed at an outer surface or inner surface of the carbon fiber. Catalytic metal is supported on the exposed edges of the hexagonal carbon layers. The edges of the hexagonal carbon layers are further exposed by removing a deposited layer formed on the outer surface or inner surface of the carbon fiber. The exposed edges of the hexagonal carbon layers have an extremely high activity and are suitable as a support for catalytic metal.

13 Claims, 18 Drawing Sheets

OTHER PUBLICATIONS

U.S. Appl. No. 10/098,461, filed Mar. 18, 2002, Yanagisawa et al.
U.S. Appl. No. 10/098,440, filed Mar. 18, 2002, Yanagisawa et al.
U.S. Appl. No. 10/098,103, filed Mar. 18, 2002, Yanagisawa et al.
U.S. Appl. No. 10/098,522, filed Mar. 18, 2002, Yanagisawa et al.
U.S. Appl. No. 10/098,379, filed Mar. 18, 2002, Yanagisawa et al.
U.S. Appl. No. 10/098,312, filed Mar. 18, 2002, Yanagisawa et al.
U.S. Appl. No. 10/098,570, filed Mar. 18, 2002, Yanagisawa et al.
Endo et al., "Structural characterizaton of cup-stacked-type nanofibers with an entirely hollow core", Applied Physics Letters, vol. 80, No. 7, Feb. 18, 2002, pp. 1267-1269.
Kim et al., "Effect of ball milling on morphology of cup-stacked carbon nanotubes", Chemical Physics Letters, Mar. 2002.
Morinobu Endo et al., "Pyrolytic Carbon Nanotubes From Vapor-Grown Carbon Fibers", Carbon, vol. 33. No. 7, pp. 873-881, 1995.
H. Terrones et al., "Graphitic Cones in Palladium Catalysed Carbon Nanofibres", Chemical Physics Letters, vol. 343, pp. 241-250, 2001.

* cited by examiner

CARBON FIBER FOR A FUEL CELL HAVING CATALYTIC METAL SUPPORTED THEREON

Japanese Patent Application No. 2001-81736 filed on Mar. 21, 2001, Japanese Patent Application No. 2001-260408 filed on Aug. 29, 2001, and Japanese Patent Application No. 2002-46771 filed on Feb. 22, 2002 are hereby incorporated by reference in their entirety.

BACKGROUND OF THE INVENTION

The present invention relates to a carbon fiber having catalytic metal supported thereon.

Conventionally, carbon black on which catalytic metal is supported is known.

This catalyst is manufactured by immersing carbon black in an aqueous solution in which catalytic metal such as platinum particles or platinum alloy particles are suspended and reducing the catalytic metal by heating and stirring, whereby platinum is deposited and supported on the carbon black particles.

Because carbon black has a large diameter of several hundreds of nanometers and deposition of catalytic metal is nonuniform, support efficiency of catalytic metal is poor. This gives rise to a problem that a sufficient catalytic effect cannot be obtained.

The platinum content in the aqueous solution must be increased in order to increase the deposited amount of the catalytic metal. If the platinum content is increased excessively, catalytic metal aggregate and the area of the outer surface of the catalytic metal is decreased. As a result, a desired catalytic effect cannot be obtained. In the case where carbon black is used as the support, catalytic metal is held in a state in which part of the catalytic metal is buried on the outer surface of the support. This decreases the area of the outer surface of the catalytic metal, whereby a satisfactory catalytic effect cannot be obtained.

BRIEF SUMMARY OF THE INVENTION

The present invention has been achieved to solve the above-described problems. The present invention may provide a carbon fiber having catalytic metal supported thereon which is capable of remarkably increasing a catalytic effect due to the reduced size of the support and the capability of supporting a large number of catalytic metal particles.

In order to solve the above problems, a first aspect of the present invention provides a carbon fiber having catalytic metal supported thereon comprising a coaxial stacking morphology of truncated conical tubular graphene layers or a truncated graphene conical tubule's morphology as a support, and each of the truncated conical tubular graphene layers includes a hexagonal carbon layer.

In other words, this carbon fiber has a cup-stacked structure or lampshade-stacked structure in which a number of hexagonal carbon layers in the shape of a cup having no bottom are stacked. The coaxial stacking morphology of the truncated conical tubular graphene layers may have a shape of a hollow core with no bridge. In this structure, each of the truncated conical tubular graphene layers has a large ring end at one end and a small ring end at the other end in an axial direction, and edges of the hexagonal carbon layers are exposed at the large ring ends on an outer surface and the small ring ends on an inner surface. In other words, the edges of the tilted hexagonal carbon layers of the herringbone structure are exposed in layers.

In an ordinary carbon fiber with a herring-bone structure, a number of hexagonal carbon layers in the shape of a cup having a bottom are stacked. However, the carbon fiber according to the first aspect of the present invention has a hollow structure with no bridge and has a length ranging from several tens of nanometers to several tens of microns.

If the coaxial stacking morphology of the truncated conical tubular graphene layers is vapor grown, a wide area of the outer surface or the inner surface may be covered with deposited films of an excess amount of pyrolytic carbon. In this aspect, at least part of edges of the hexagonal carbon layers may be exposed at the large ring ends on the outer surface or at the small ring ends on the inner surface.

In the first aspect of the present invention, the catalytic metal is supported on the exposed edges of the hexagonal carbon layers.

The edges of the hexagonal carbon layers exposed on the outer surface or inner surface of the carbon fiber have an extremely high activity, and the catalytic metal is suitably supported.

According to a second aspect of the present invention, part or all of the deposited films formed over the outer surface or the inner surface during the vapor growth process of the carbon fiber may be removed by a treatment to be performed later. Since these deposited layers are formed of an excess amount of insufficiently crystallized amorphous carbon, the surfaces of the deposited layers are inactive. The catalytic metal may be supported on the edges of the hexagonal carbon layers exposed by removing the deposited films.

In the carbon fiber according to the first aspect of the present invention, an outer surface of the carbon fiber may be formed of the large ring ends stacked in the axial direction. In this case, exposed part of the edges of the hexagonal carbon layers may have an area equal to or more than 2 percentages of an area of the outer surface, and preferably 7 percentages of the area of the outer surface.

Positions of the large ring ends forming the outer surface may be irregular, and the outer surface may have minute irregularity at the level of atoms.

Similarly, an inner surface of the carbon fiber may be formed of the small ring ends stacked in the axial direction. Positions of the small ring ends forming the inner surface may be irregular, and the inner surface may have minute irregularity at the level of atoms.

The catalytic metal may be supported on a substantially smooth outer surface or inner surface of the carbon fiber on which large ring ends or small ring ends are positioned regularly. However, the catalytic metal may be supported on their regular outer surface or inner surface. In the case where the recessed portions of the irregular surface are grooves, a large number of catalytic metal particles may be supported along the grooves in a chain configuration. Therefore, support efficiency of the catalytic metal is improved, whereby the catalytic effect is increased.

As the catalytic metal, at least one of platinum and platinum alloy may be suitably supported, and may be effective as a catalyst.

These catalysts are effectively used as catalytic substances for fuel cells and the like.

DETAILED DESCRIPTION OF THE EMBODIMENT

One embodiment of the present invention is described below in detail with reference to the drawings.

A vapor grown carbon fiber is a short fiber in which carbon obtained by pyrolysis of hydrocarbons such as benzene or methane at a temperature of about 700° C. to 1000° C. is grown with a catalyst particle such as an ultra-fine iron particle or nickel as a nucleus.

Carbon fibers generally have a structure in which the hexagonal carbon layers are grown concentrically or a structure in which the hexagonal carbon layers are grown in an axial direction of the fiber. However, depending upon the vapor growth conditions such as catalyst, temperature range, and flow rate, carbon fibers may have a herring-bone structure in which the stacked hexagonal carbon layers are tilted with respect to the fiber axis at a specific angle.

Carbon fibers with a herring-bone structure generally have a structure in which a number of hexagonal carbon layers in the shape of a cup having a bottom are stacked. However, the vapor-grown carbon fiber according to one embodiment of the present invention has a structure in which a number of hexagonal carbon layers in the shape of a cup having no bottom are stacked (this bottomless carbon fiber is hereinafter called "carbon fiber having a herring-bone structure").

Figure 15:
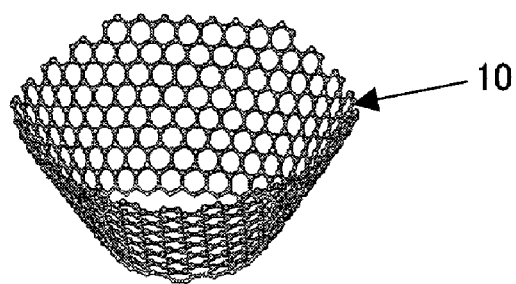
FIG. 15 is a computer graphic showing a hexagonal carbon layer, which is a unit of the coaxial stacking morphology of the truncated conical tubular graphene layers shown in FIG. 14, based on rigorous quantum theoretical calculation.
Figure 14:
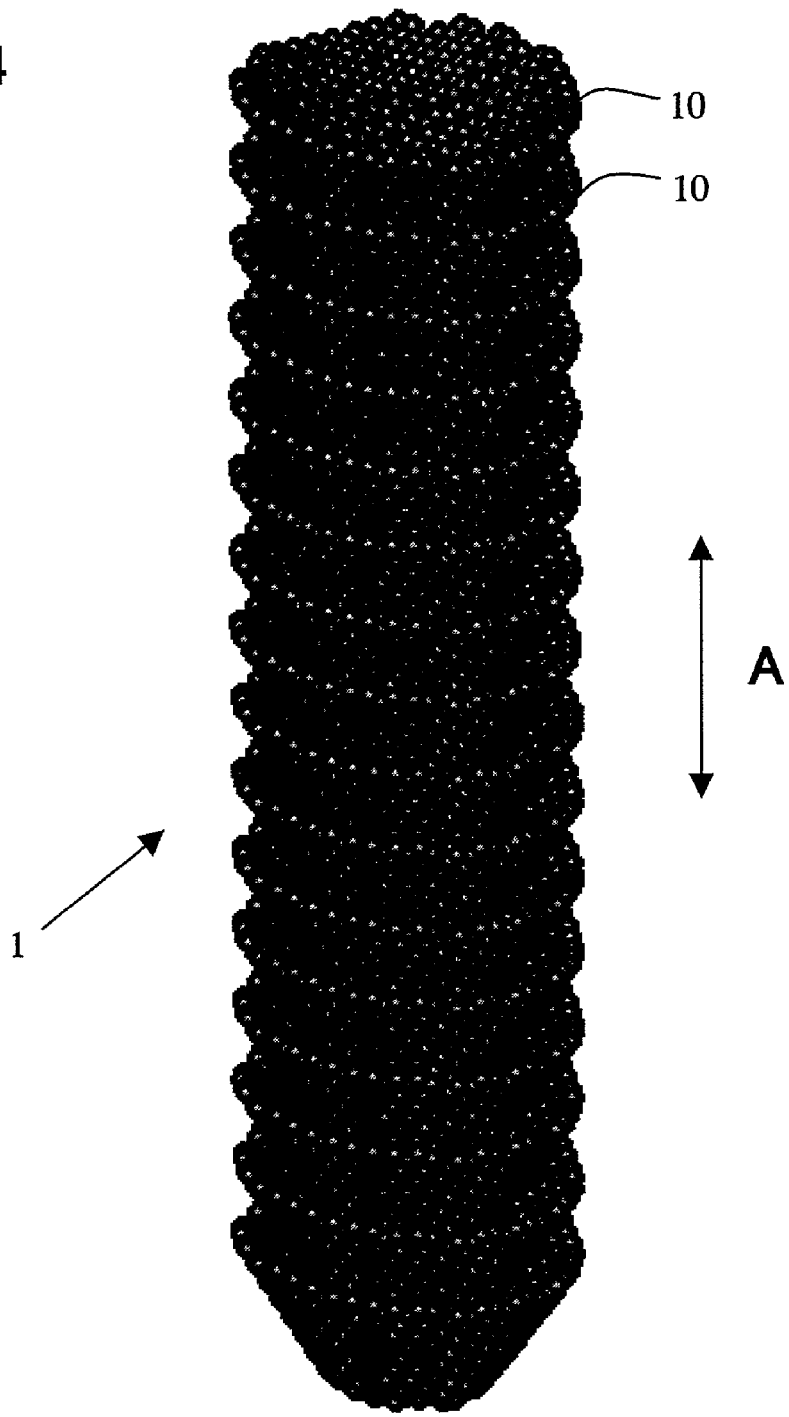
FIG. 14 is a computer graphic showing a coaxial stacking morphology of truncated conical tubular graphene layers based on rigorous quantum theoretical calculation.

Specifically, this carbon fiber 1 has a coaxial stacking morphology of truncated conical tubular graphene layers shown by a computer graphic in FIG. 14. Each of the truncated conical tubular graphene layers is formed of a hexagonal carbon layer 10 shown in FIG. 15. Although the actual hexagonal carbon layers 10 shown in FIG. 14 are stacked densely in an axial direction A, they are stacked roughly in FIG. 14 for convenience of description.

Figure 16:
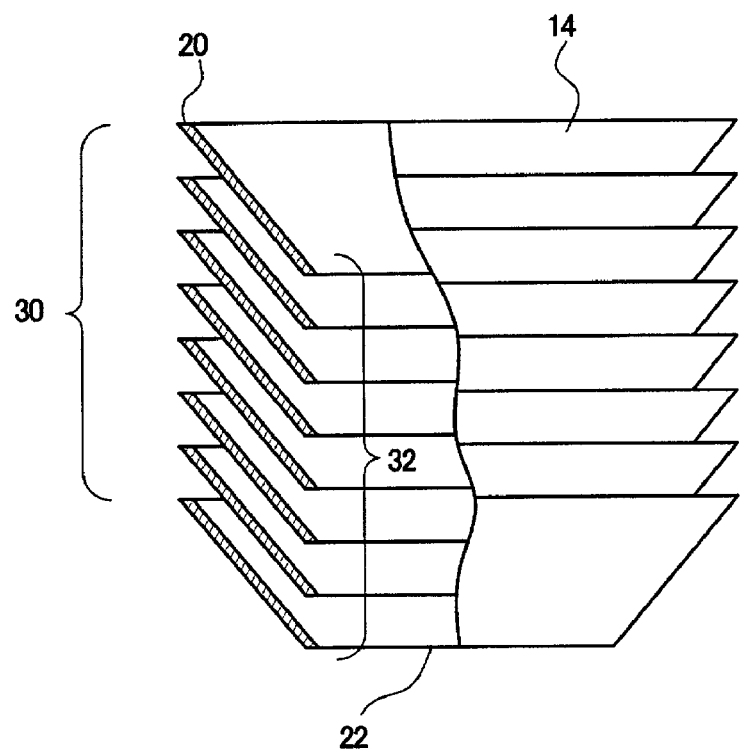
FIG. 16 is a schematic view of a large ring end and a small ring end which respectively form an outer surface and an inner surface of the coaxial stacking morphology of truncated conical tubular graphene layers.

FIG. 16 is a schematic view of FIG. 14. Each of the hexagonal carbon layers 10 has a large ring end 20 at one end and a small ring end 22 at the other end in the axial direction. An outer surface 30 of the carbon fiber 1 is formed of the large ring ends 20 stacked in the axial direction A. An inner surface 32 of the carbon fiber 1 is formed of the small ring ends 22 stacked in the axial direction A. The carbon fiber 1 is thus in the shape of a hollow core with no bridge and has a center hole 14.

An example of a method of manufacturing the carbon fiber 1 shown in FIG. 14 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3 \times 10^{-7}$ mol/s. The reaction temperature and the reaction time were about 1100° C. and about 20 minutes, respectively. As a result, a carbon fiber having a herring-bone structure with an average diameter of about 100 nenometers was obtained. A hollow carbon fiber having no bridge at a length ranging from several tens of nanometers to several tens of microns, in which a number of hexagonal carbon layers in the shape of a cup having no bottom are stacked, is obtained by adjusting the flow rate of the raw material and the reaction temperature (which are changed depending on the size of the reactor).

Figure 1:
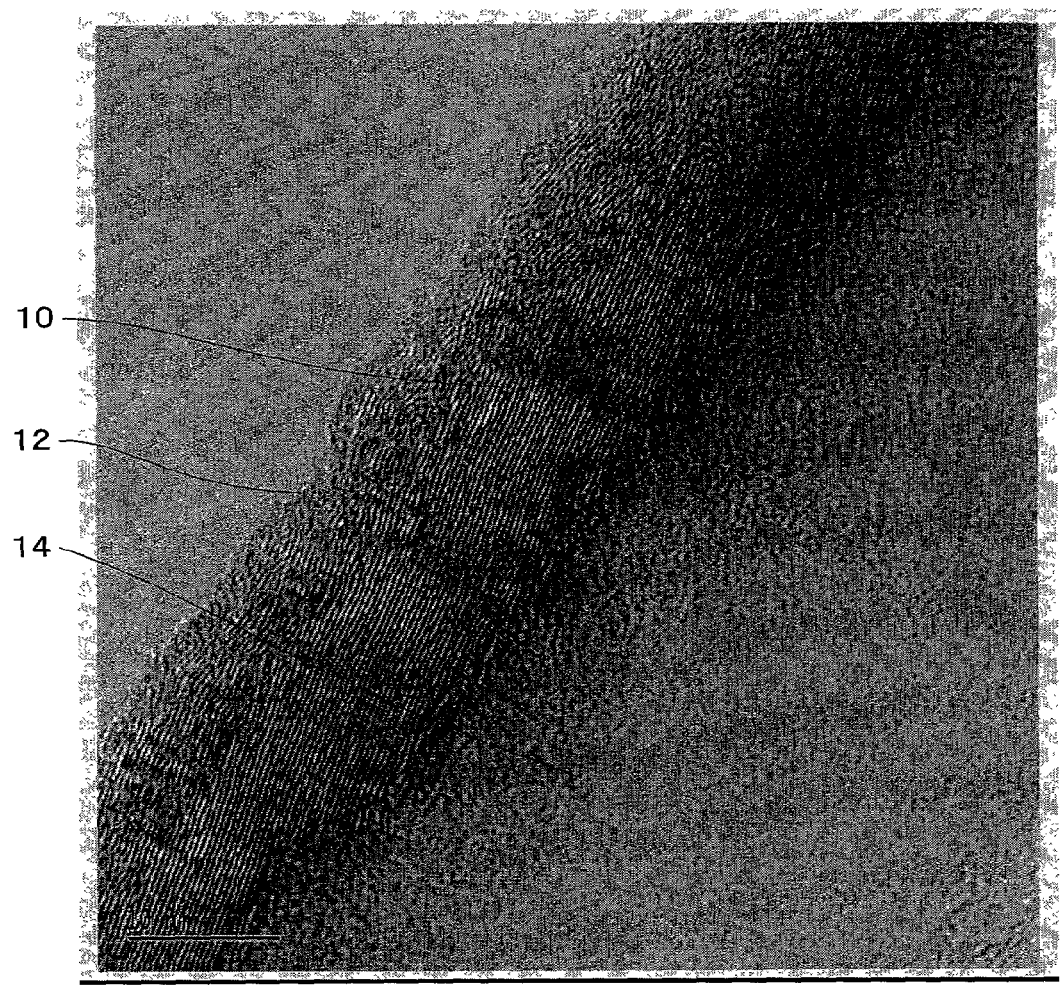
FIG. 1 is a copy of a transmission electron micrograph showing a carbon fiber having a herring-bone structure manufactured by a vapor growth process.
Figure 2:
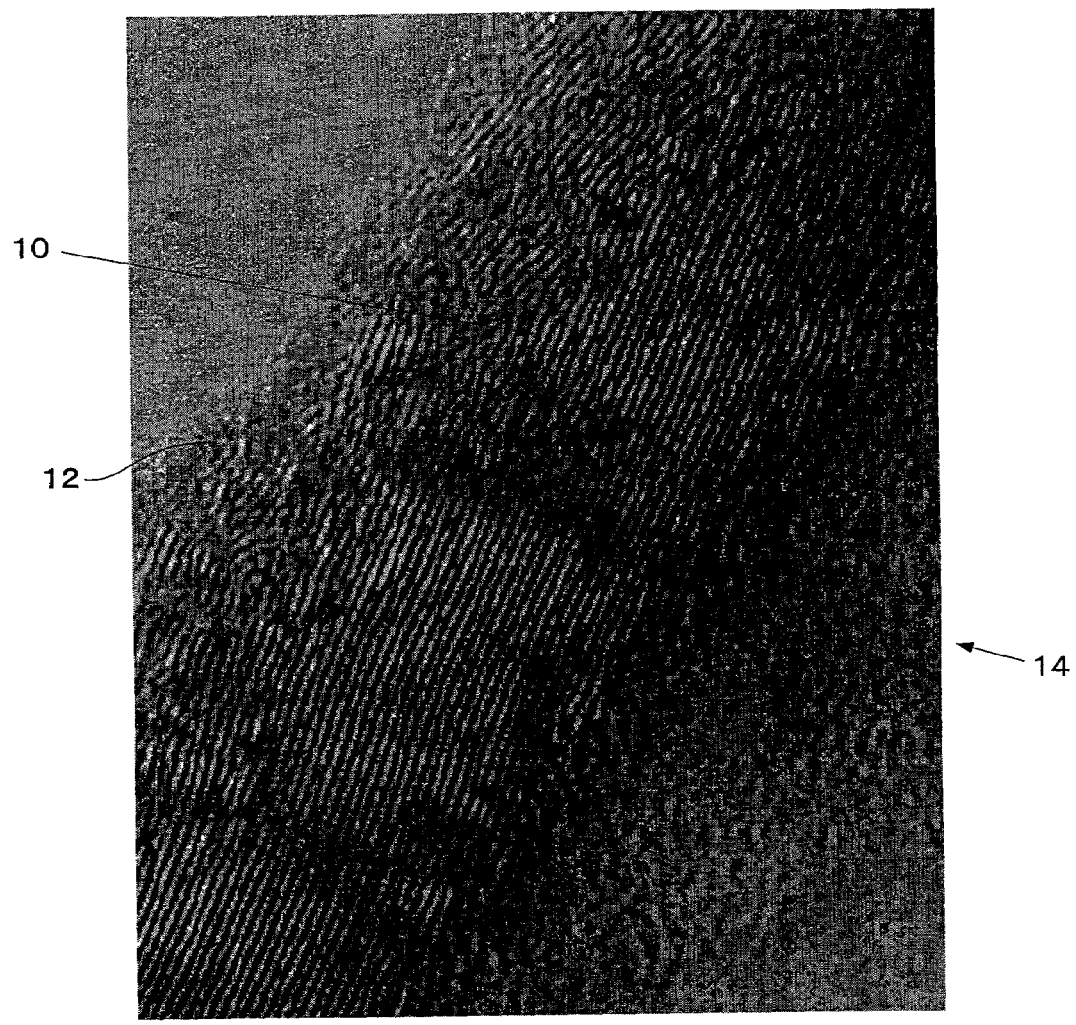
FIG. 2 is a copy of an enlarged micrograph of FIG. 1.
Figure 3:
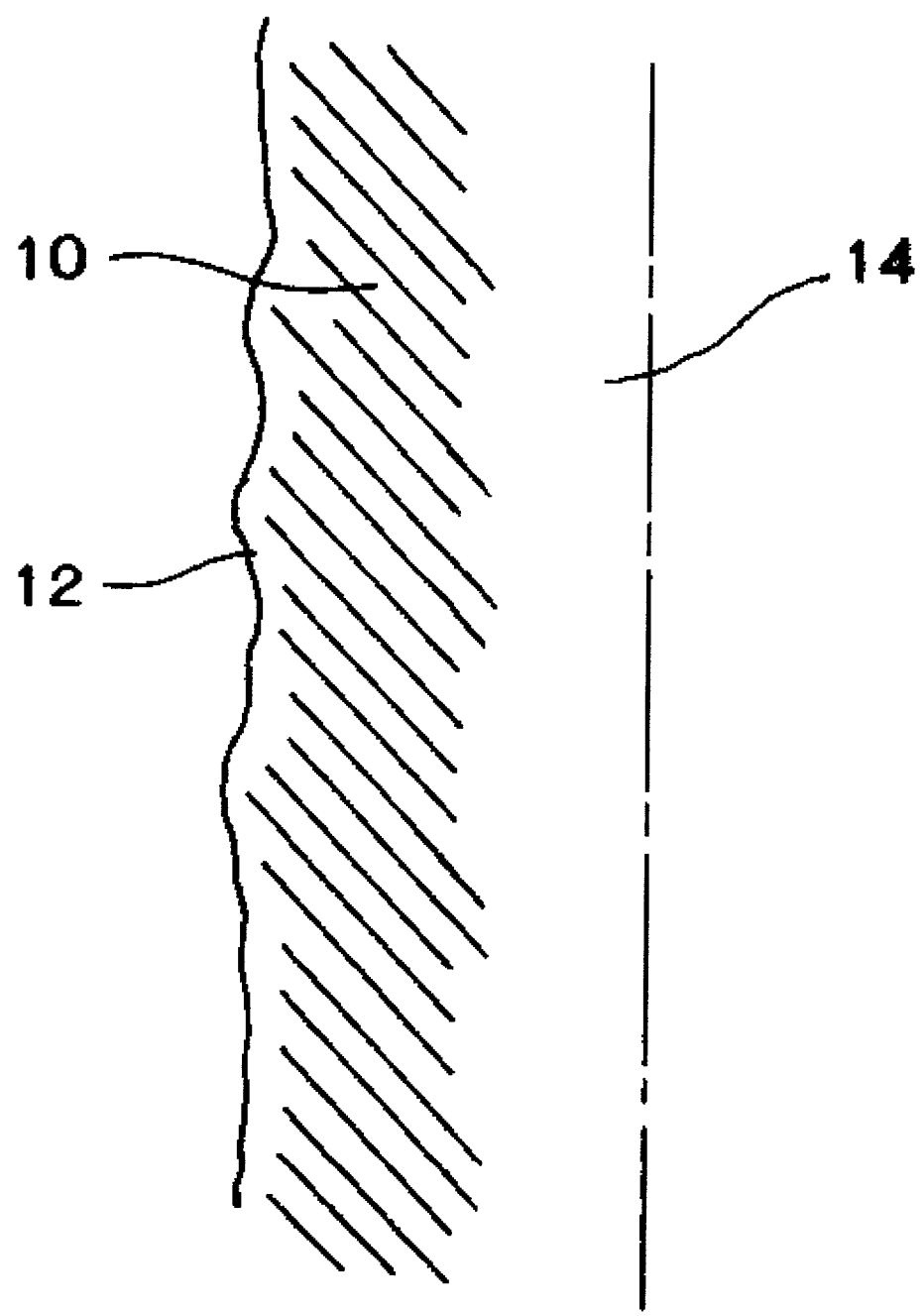
FIG. 3 is a schematic view of FIG. 2.

FIG. 1 is a copy of a transmission electron micrograph showing the carbon fiber having a herring-bone structure manufactured by the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. The thickness of the deposited layer 12 is about several nanometers. A reference numeral 14 indicates the center hole.

Figure 17:
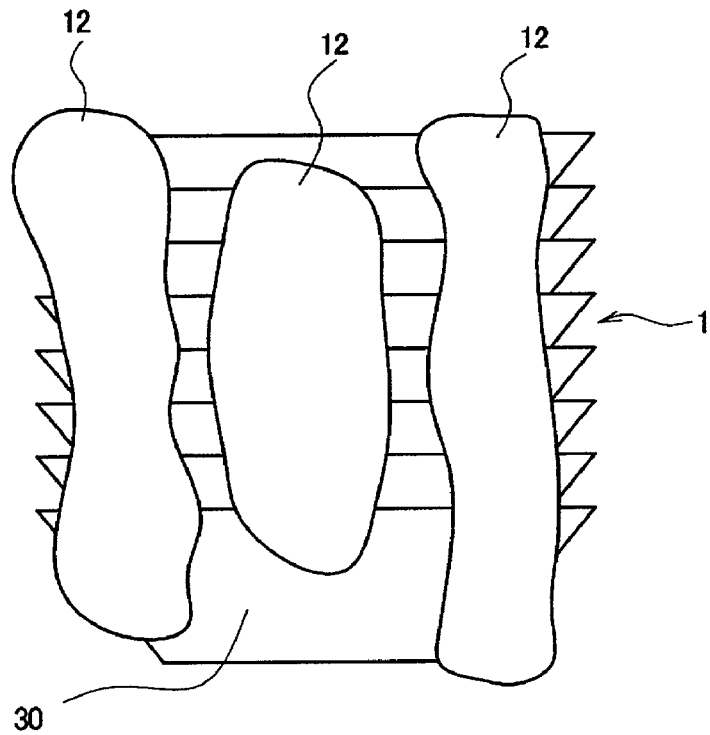
FIG. 17 is a schematic view of a deposited film of pyrolytic carbon formed over a wide range of an outer surface of a carbon fiber.

FIG. 17 is a schematic view showing a state in which the deposited films 12 are formed over a wide area of the outer surface 30 of the carbon fiber 1. As shown in FIG. 17, the hexagonal carbon layers 10 are exposed on the large ring ends 20 in the areas in which the outer surface of the carbon fiber 1 is not covered with the deposited films 12. These areas have a high activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520° C. to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
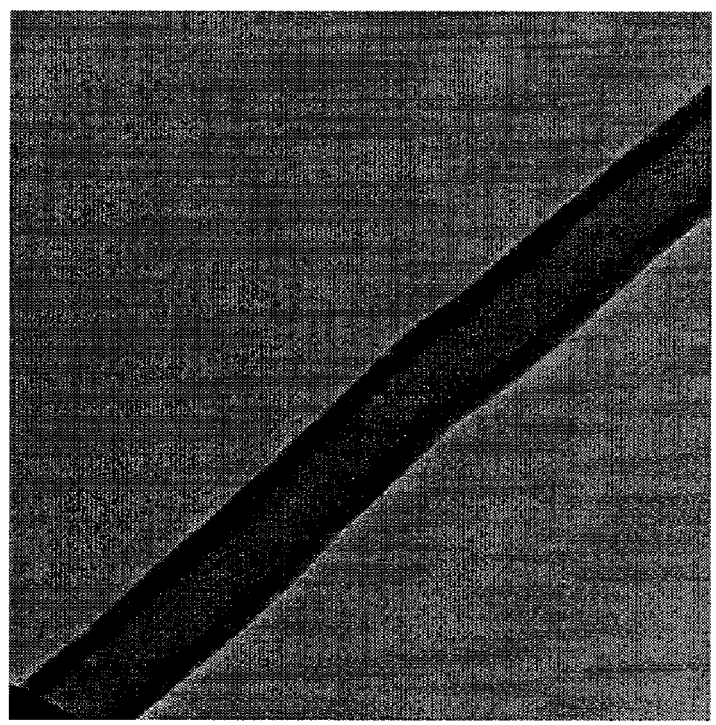
FIG. 4 is a copy of a transmission electron micrograph showing a carbon fiber having a herring-bone structure heated at a temperature of about 530° C. for one hour in air.
Figure 5:
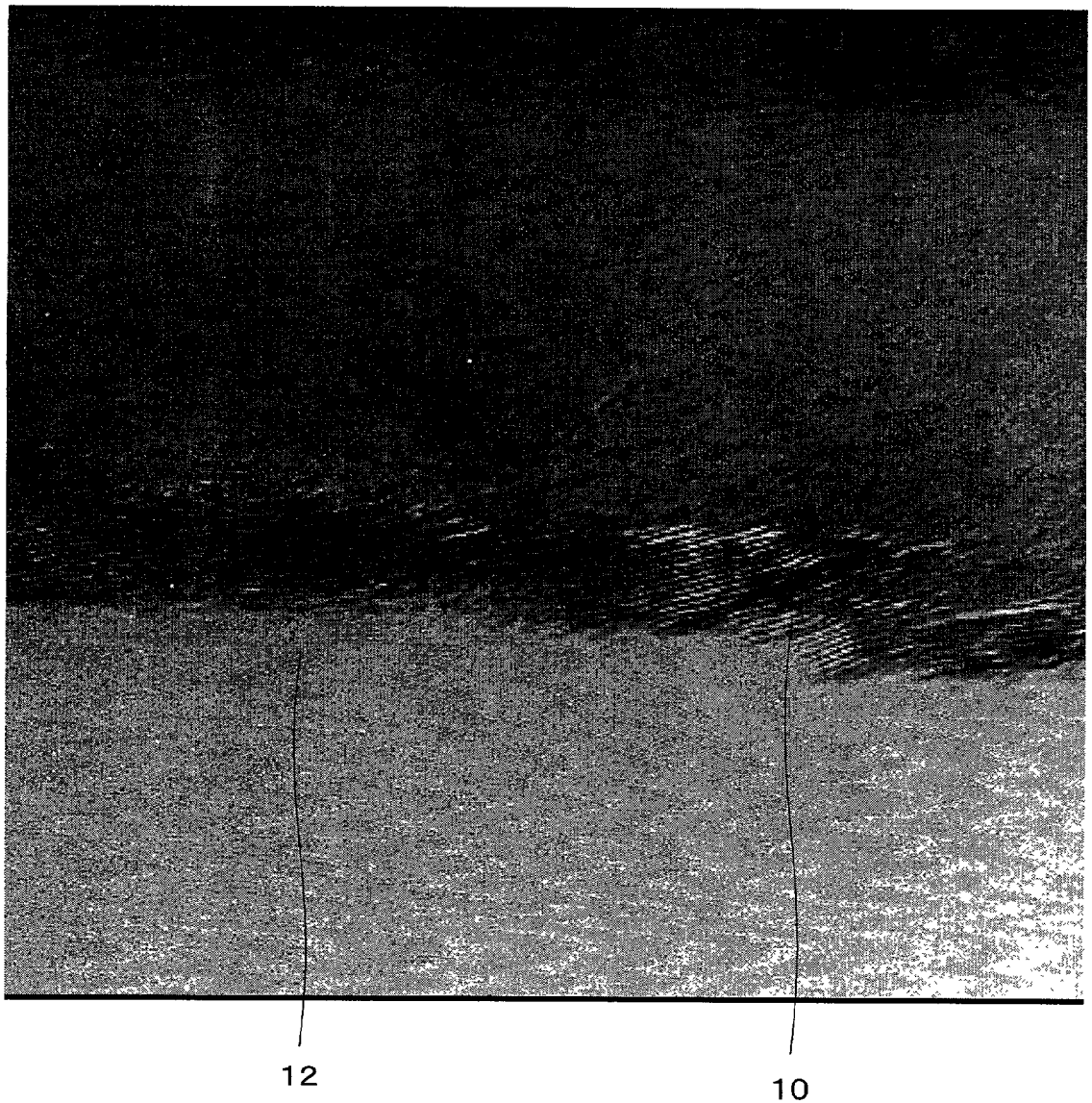
FIG. 5 is a copy of an enlarged micrograph of FIG. 4.

FIG. 4 is a copy of a transmission electron micrograph showing the carbon fiber having a herring-bone structure heated at a temperature of about 530° C. for one hour in air. FIG. 5 is a copy of an enlarged micrograph of FIG. 4, FIG. 6 is a copy of an enlarged micrograph of FIG. 5, and FIG. 7 is a schematic view of FIG. 6.

Figure 6:
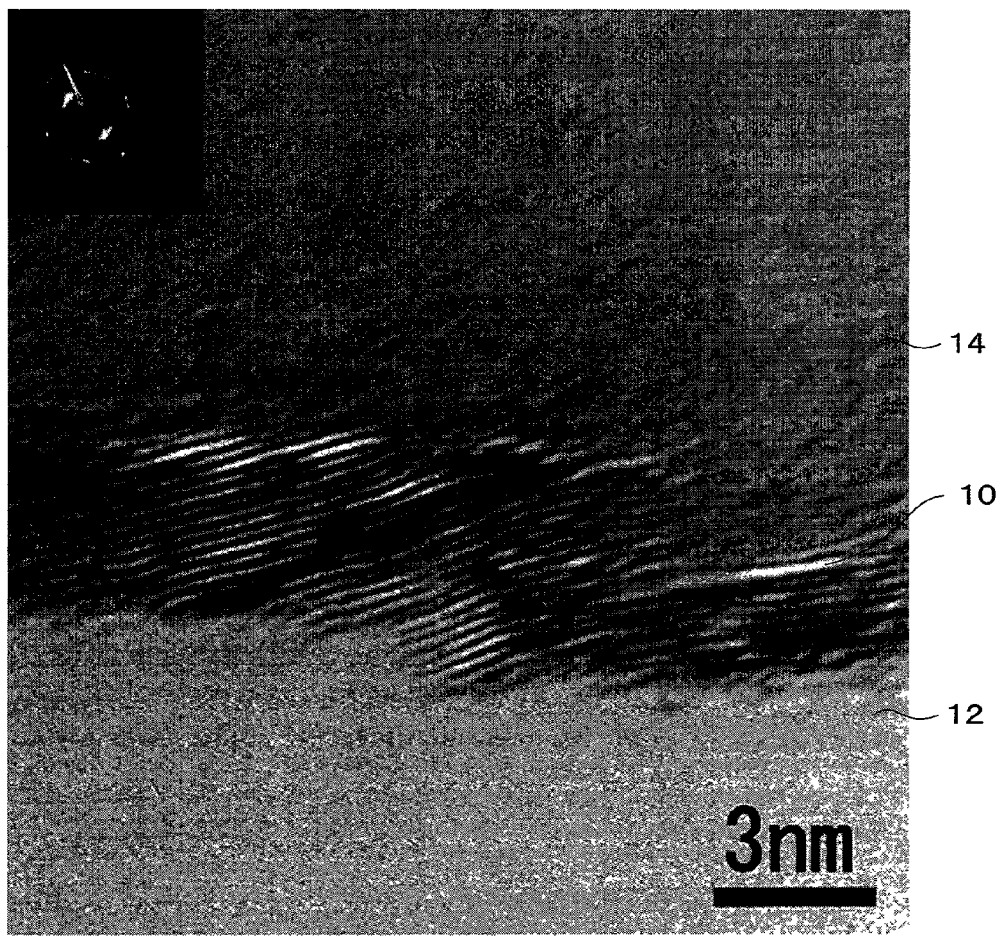
FIG. 6 is a copy of an enlarged micrograph of FIG. 5.
Figure 7:
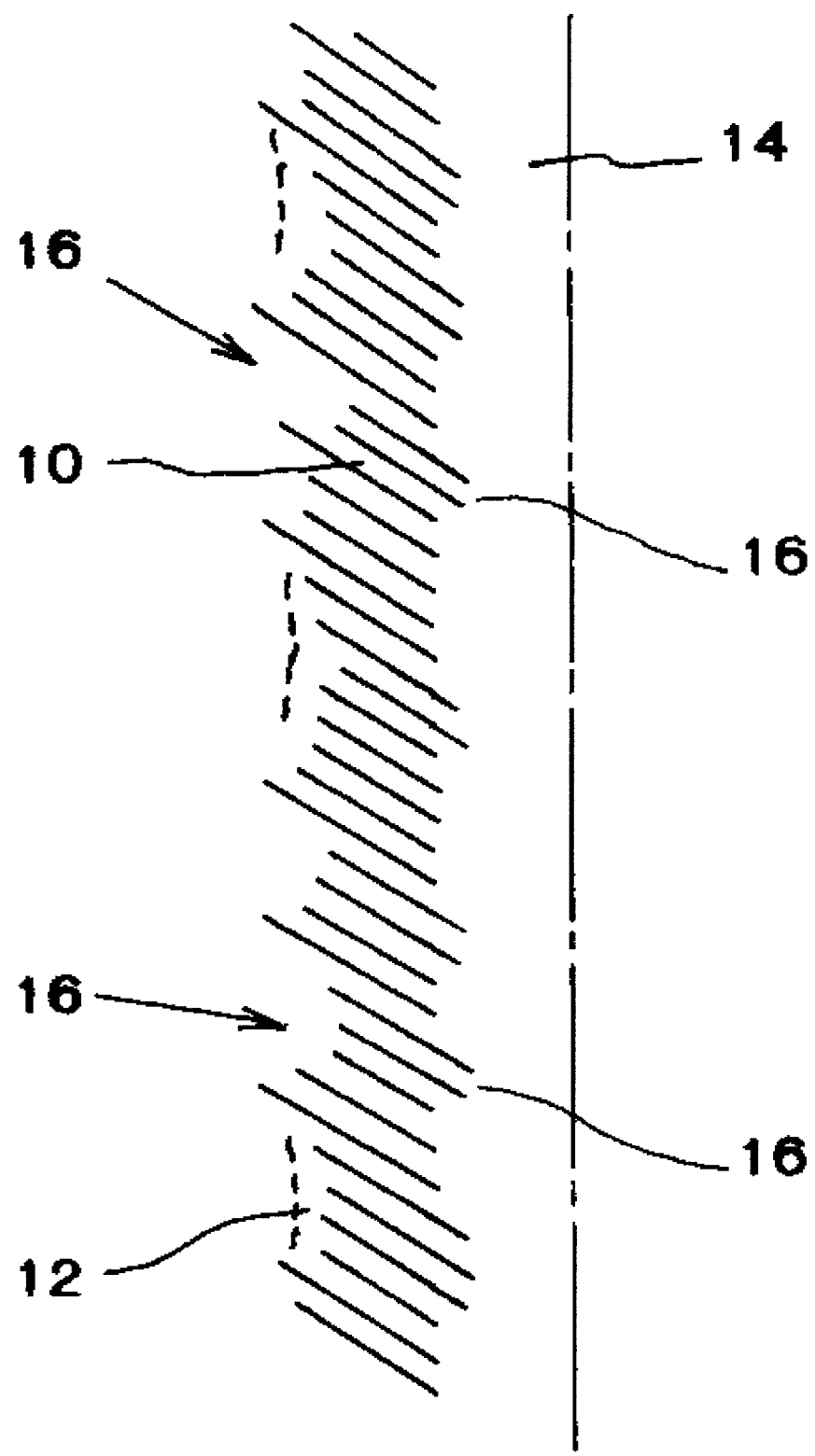
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a cup having no bottom are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

Figure 8:
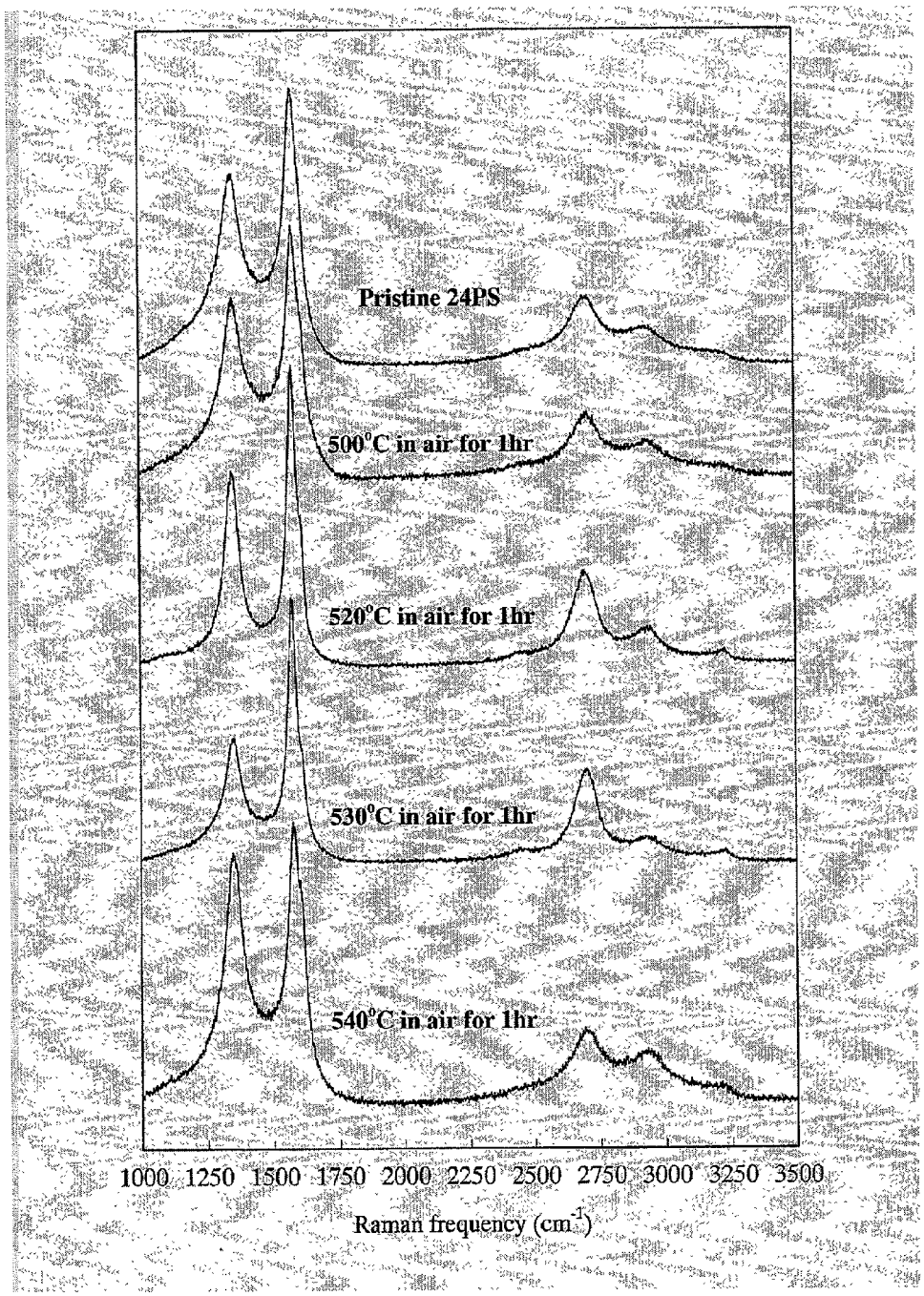
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 $cm^{-1}$) and the G peak (1580 $cm^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high activity, since the substances are scarcely intercalated. Therefore, the carbon fiber functions as an efficient support.

Figure 9:
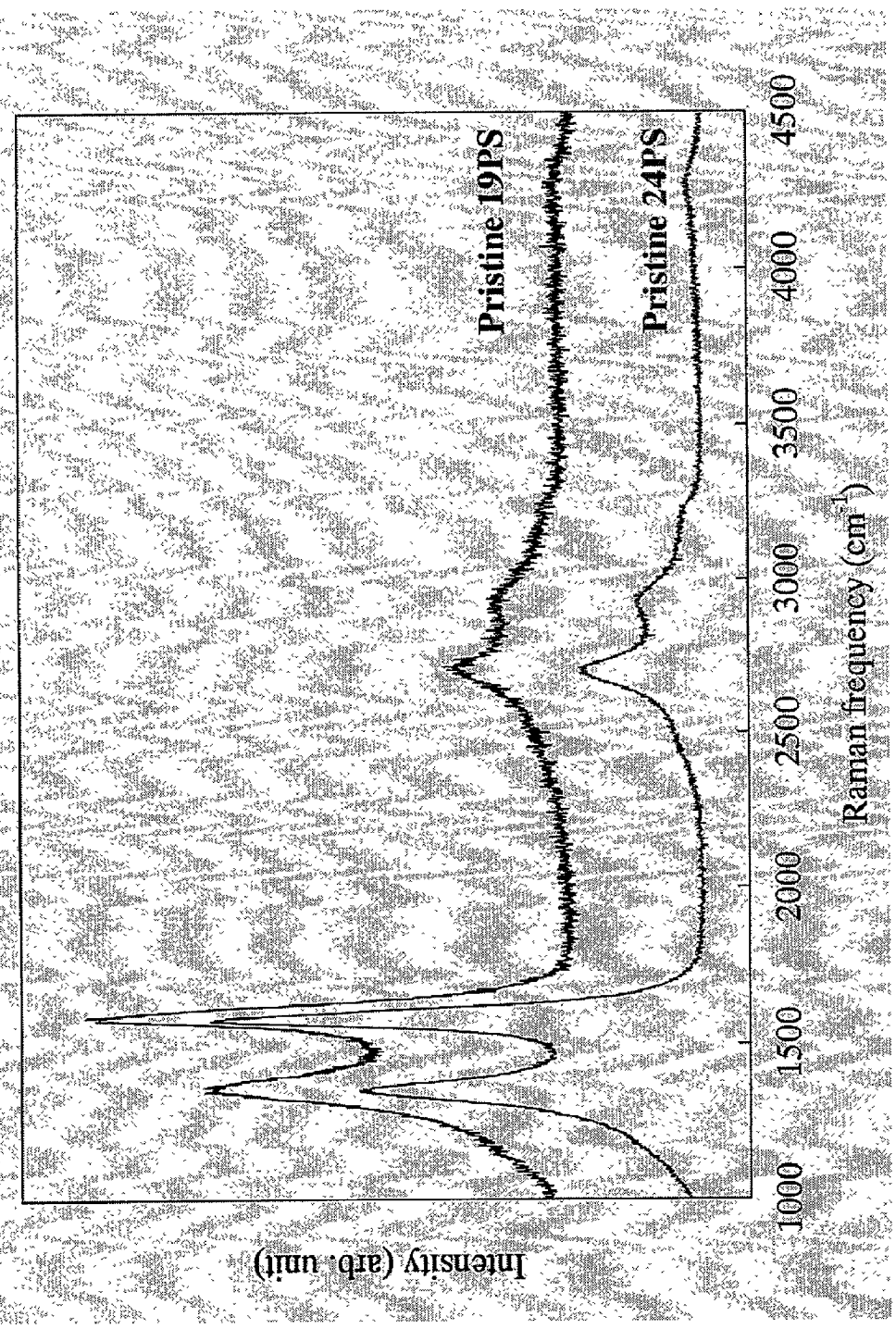
FIG. 9 is a characteristic chart showing the Raman spectra of carbon fiber samples No. 19PS and No. 24PS in which edges of hexagonal carbon layers are exposed by the above heat treatment.

FIG. 9 shows the Raman spectra of carbon fiber samples No. 19PS and No. 24PS in which the edges of the hexagonal carbon layers are exposed by the above heat treatment.

Figure 10:
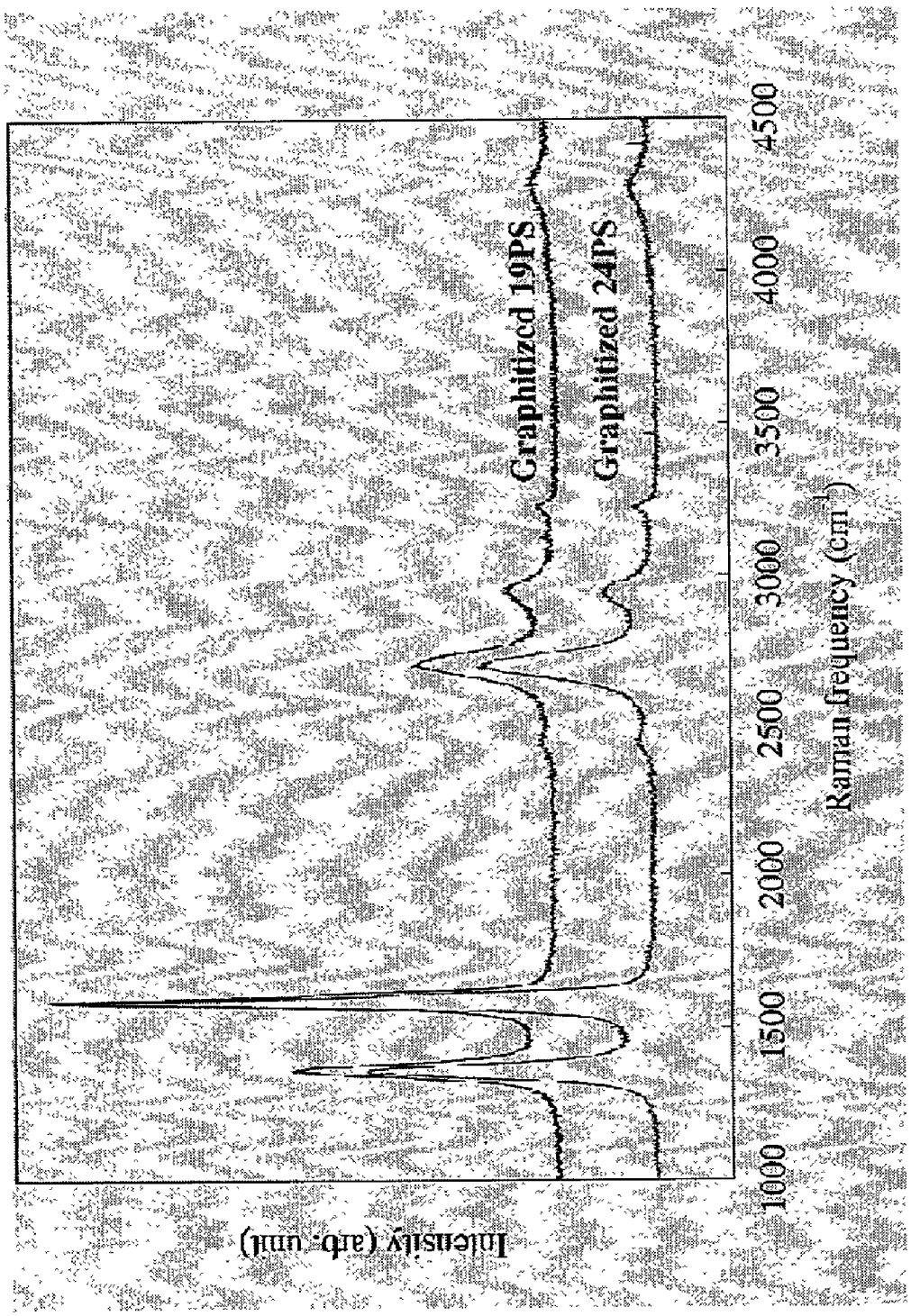
FIG. 10 is a characteristic chart showing the Raman spectra of the carbon fiber samples No. 19PS and No. 24PS, heated at 3000° C. after the edges of the hexagonal carbon layers has been exposed.

FIG. 10 shows the Raman spectra of the carbon fiber samples No. 19PS and No. 24PS, heated at 3000° C. (common graphitization treatment) after the edges of the hexagonal carbon layers has been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The exposed edges of the hexagonal carbon layers 10 of the carbon fiber having the above properties easily bond to other atoms and have extremely high activity.

A carbon fiber having catalytic metal supported thereon has been manufactured using this carbon fiber.

An example of a manufacturing method is described below.

1. The above carbon fiber was mixed in a solution of ethanol and chloroplatinic acid. The mixture was stirred for one hour.

2. An aqueous solution of sodium borohydride was added to the above mixture to reduce chloroplatinic acid.

3. After one minute of reduction treatment, an aqueous solution of hydrochloric acid was added to the mixture to decompose an excessive amount of sodium borohydride.

4. After five minutes, a carbon fiber on which catalytic metal was supported was removed by filtration.

5. After filtration, the carbon fiber was immersed in an aqueous solution of ammonium bicarbonate to neutralize the catalytic metal, and then washed with purified water.

6. After removing water, the mixture was dried under vacuum to obtain a carbon fiber on which catalytic platinum metals were supported.

The carbon fiber having the herring-bone structure thus obtained is a short fiber with a length of several tens of microns in which several tens of thousands to several hundreds of thousands of bottomless cup-shaped, specifically, truncated conical tubular hexagonal carbon layers are stacked. This short fiber is insoluble due to a high molecular weight (length).

The carbon fiber product according to one embodiment of the present invention is obtained by dividing the above short fiber into pieces in which one to several hundreds of hexagonal carbon layers are stacked. The carbon fiber product becomes soluble if the molecular weight is reduced by decreasing the number of stacked layers, in particular, if the number of hexagonal carbon layers is one.

The short fiber may be divided by adding an appropriate amount of water or solvent and grinding the short fiber gently using a mortar and pestle.

Specifically, the short fiber (in which the deposited layers 12 may be formed, or part or all of the deposited layers 12 maybe removed) is placed in a mortar, and ground mechanically and gently using a pestle.

The carbon fiber product in which one to several hundreds of hexagonal carbon layers are stacked can be obtained by experimentally determining the treatment time in a mortar.

Since the cyclic hexagonal carbon layers have a comparatively high strength and are bonded to one another by only a weak Van der Waals force, the cyclic hexagonal carbon layers are separated without being crushed between layers in which the bond is particularly weak.

It is preferable to grind the short fiber using a mortar and pestle in liquid nitrogen. Water in air is absorbed when liquid nitrogen is evaporated and becomes ice. Therefore, the short fiber can be separated between unit fiber layers as described above, while reducing mechanical stress by grinding the short fiber together with ice using a mortar and pestle.

The carbon fiber may be ground by ball milling on an industrial scale.

Figure 11:
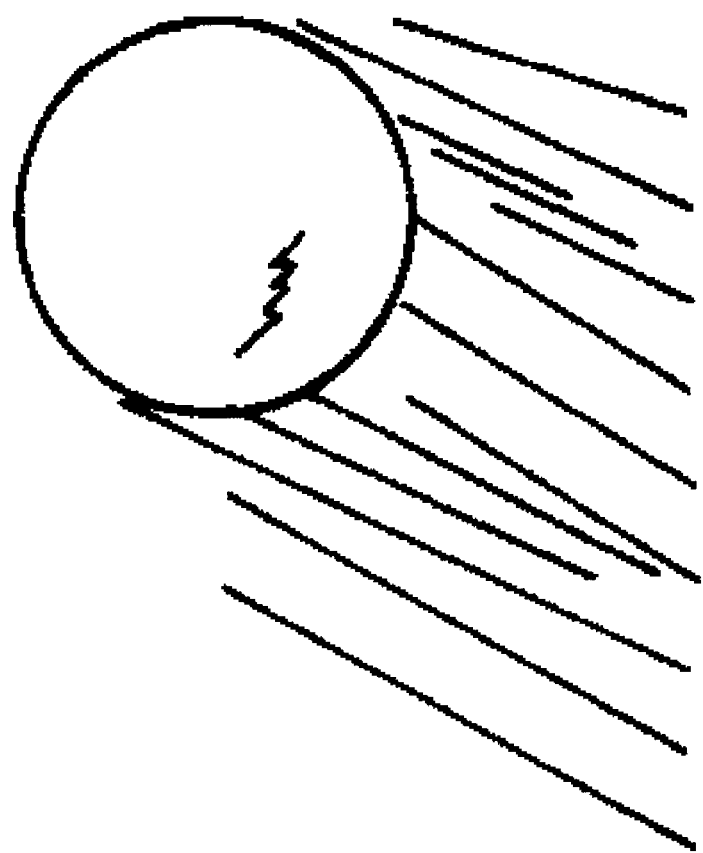
FIG. 11 is a schematic view showing a state in which catalytic metal (platinum) is supported.

FIG. 11 is a schematic view showing a state in which the catalytic metal (platinum) is supported.

The size of the platinum atom is about 30 Å and the interval between the hexagonal carbon layers is 3.5 Å. The platinum atom is supported in an area corresponding to about ten layers of the hexagonal carbon layers.

Figure 12:
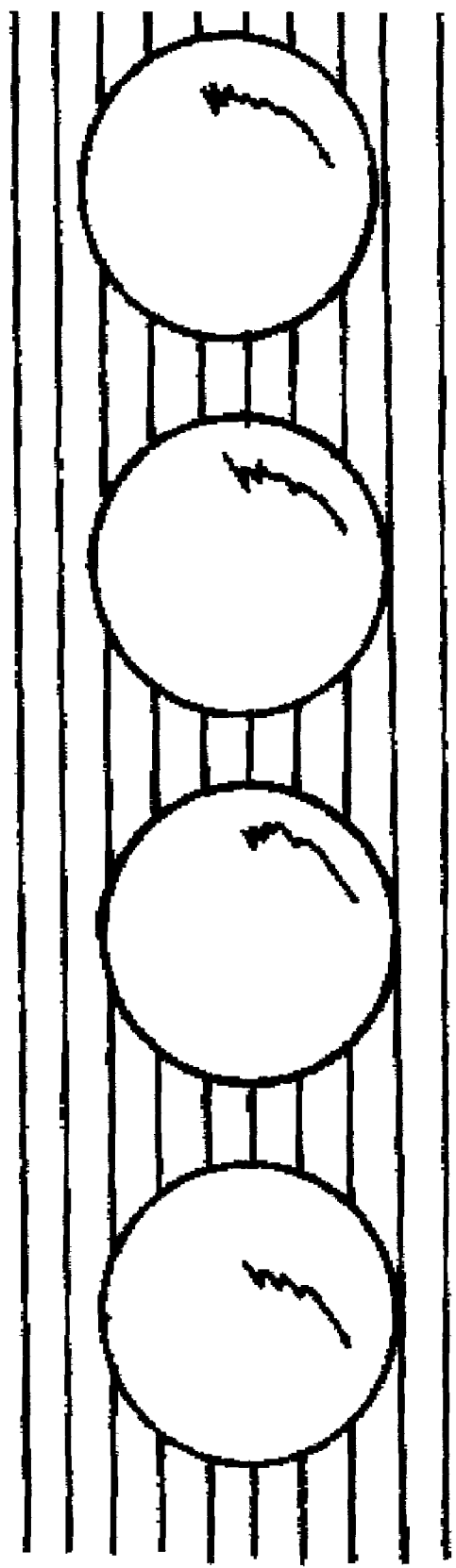
FIG. 12 is a schematic view showing a state in which catalytic metal is supported in a chain configuration.

The outer surface and the inner surface of the carbon fiber on which the edges of the hexagonal carbon layers are exposed have irregularities. The platinum atoms are held in the recessed portions of the irregularities. The recessed portions are grooves extending almost in the circumferential direction. A large number of platinum metal particles are held in the grooves continuously in a chain configuration, as shown in FIG. 12. The catalytic metal particles are also supported on projected portions or smooth portions on the inner and outer surfaces in addition to the recessed portions on the inner and outer surfaces.

If the deposited layers 12 on which excess amount of amorphous carbon is deposited are formed on the surface of the carbon fiber, catalytic metal is hard to be supported on the surface. Therefore, the amount of catalytic metal to be supported on the outer surface of the carbon fiber can be controlled by adjusting the conditions of pyrolytic treatment for removing the deposited layers 12.

In the case of a carbon fiber in which several tens of thousands to several hundreds of thousands of graphene layers are stacked (length at several tens of microns), catalytic metal is hard to be supported on the inner surface of the carbon fiber due to an increased fiber length. On the contrary, in the case of a carbon fiber which is divided so that one to several hundreds of graphene layers are stacked, catalytic metal is easily supported on the inner surface of the carbon fiber due to a decreased fiber length.

Since the position and the amount of catalytic metal to be supported can be controlled in this manner, a catalyst having various degrees of activity can be prepared.

The specific surface area of the carbon fiber of the present invention is not as large as that of carbon black (about 200 $m^2/g$ or less, whereas the surface area of carbon black is 1000 $m^2/g$). However, in the case of using carbon black, since catalytic metal tends to be supported in cracks formed therein, it is difficult to use carbon black as a catalyst. On the contrary, in the case of using the carbon fiber of the present invention, since catalytic metal is supported on the highly active surface of the carbon fiber as described above, efficiency as a catalyst is extremely high. Since the carbon fiber has a very minute diameter of about 100 nm, a large amount of platinum metal is held thereon, whereby the catalytic effect is remarkable. Therefore, catalytic efficiency the same as that obtained by using a large amount of carbon black can be achieved by using a small amount of the carbon fiber.

Since the carbon fiber has an extremely minute diameter of about 100 nm, a large number of platinum metal particles are held, whereby the catalytic effect is remarkable.

Figure 13:
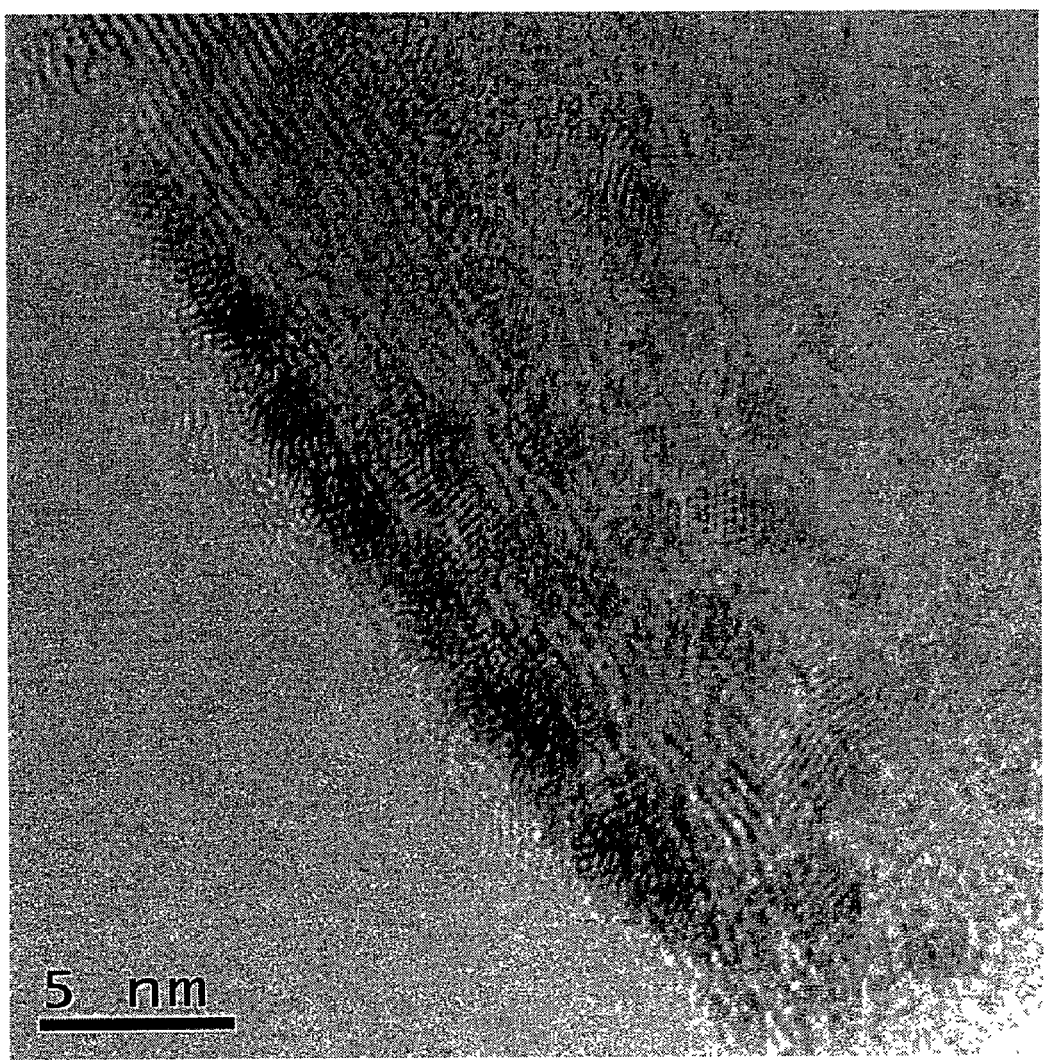
FIG. 13 is a copy of a transmission electron micrograph showing a state in which catalytic metal (platinum) is supported.

FIG. 13 is a copy of a transmission electron micrograph showing a state in which the catalytic metal particles (platinum) are supported (black areas on the edge indicate platinum).

Figure 18:
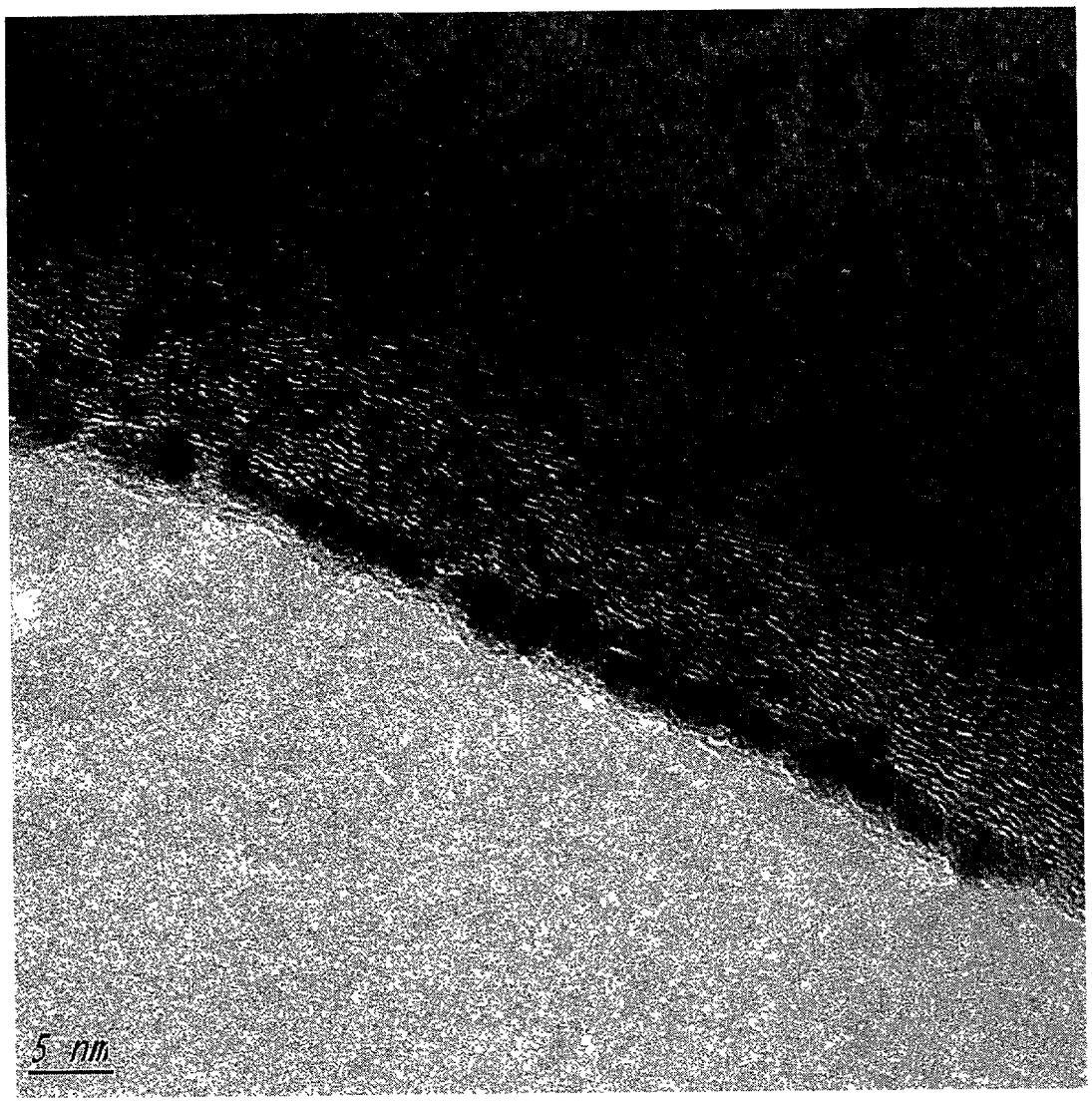
FIG. 18 is a copy of a transmission electron micrograph showing a state in which catalytic metal is selectively supported on the outer surface of the carbon fiber.
Figure 19:
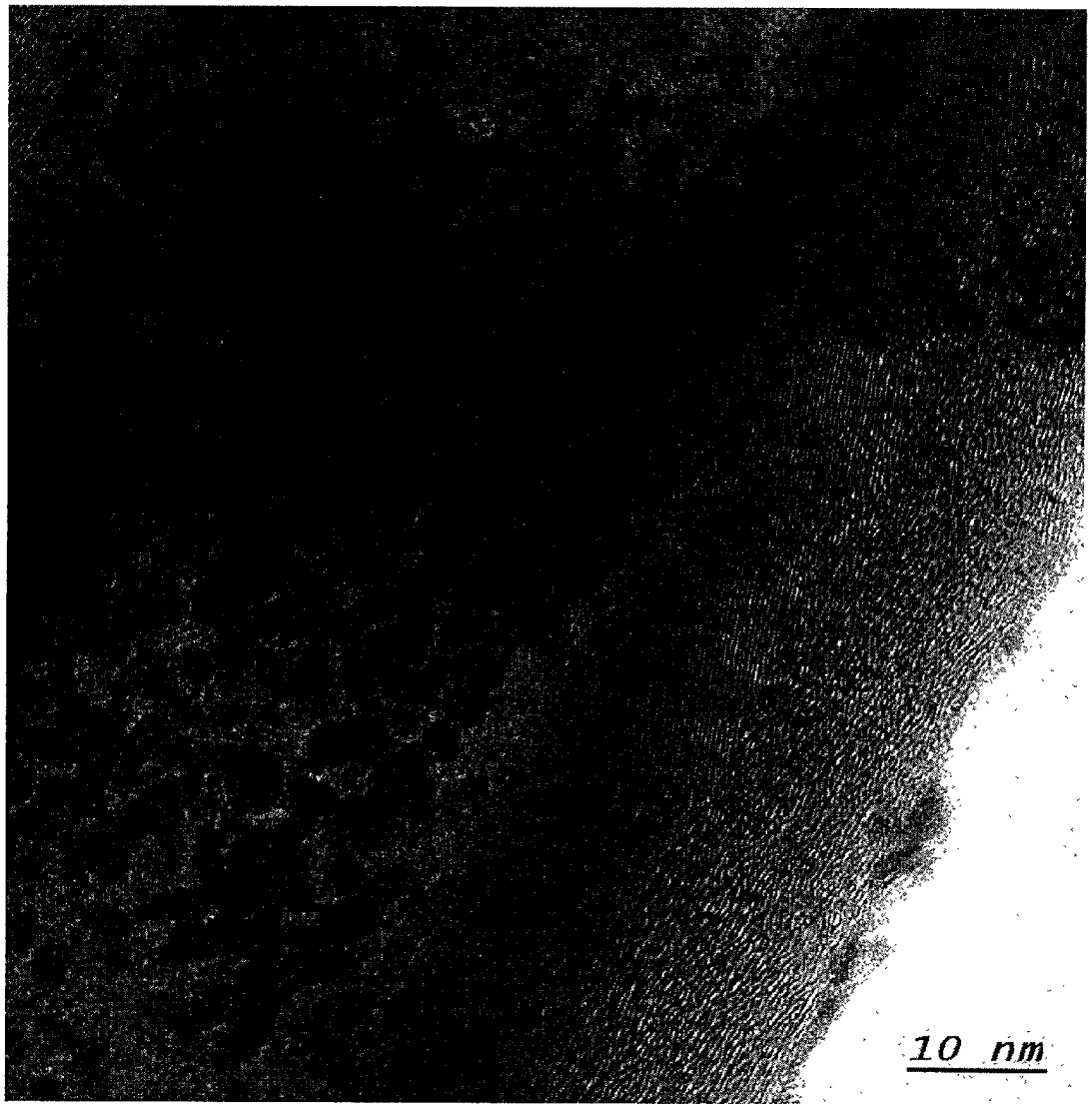
FIG. 19 is a copy of a transmission electron micrograph showing a state in which catalytic metal is selectively supported on the inner surface of the carbon fiber.
Figure 20:
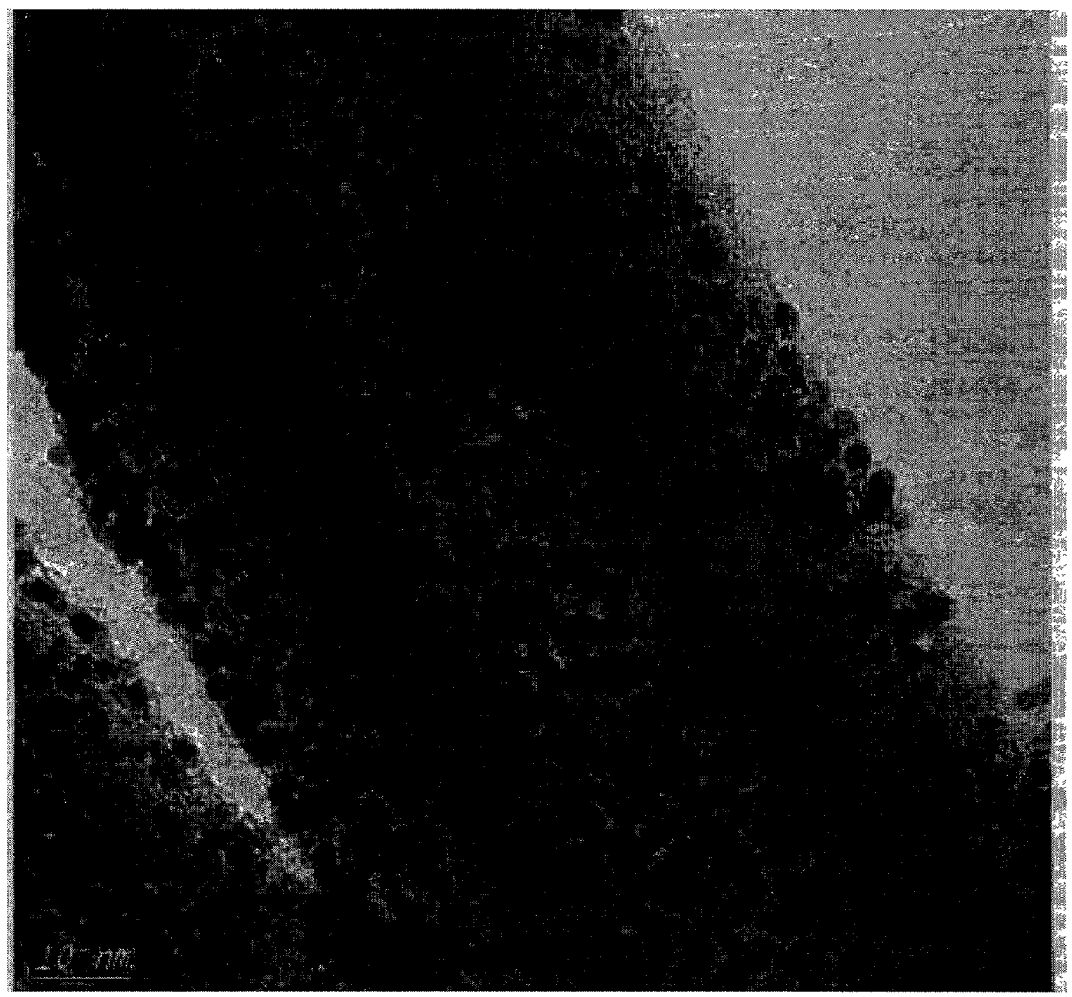
FIG. 20 is a copy of a transmission electron micrograph showing a state in which catalytic metal is selectively supported on the inner and outer surfaces of the carbon fiber.

FIGS. 18 to 20 are copies of transmission electron micrographs showing a state in which catalytic metal is selectively supported on the outer surface, the inner surface, the inner and outer surfaces of the carbon fiber, respectively.

The carbon fiber on which the catalytic platinum metals are supported can be suitably used as a catalyst for fuel cells and the like. The carbon fiber can be used as a catalyst not only for fuel cells but also for other applications.

The carbon fiber can be used as a support for catalytic metal such as platinum alloy, ruthenium, or palladium in addition to platinum.

The edges of the hexagonal carbon layers exposed by removing the deposited layers have an extremely high activity, whereby the catalytic metal is suitably supported.

In the case of using carbon black, part of the supported catalytic metal is incapable of exhibiting the catalytic effect. In the case of using the carbon fiber of the present invention, an effect same as the catalytic effect in the case of using carbon black can be obtained even if the amount of catalytic metal is smaller.

What is claimed is:

1. A stacked cup carbon nanofiber for a fuel cell having catalytic metal supported thereon comprising a vapor grown coaxial stacking morphology of truncated conical tubular graphene layers, wherein each of the truncated conical tubular graphene layers includes a hexagonal carbon layer and has a large ring end at one end and a small ring end at the other end in an axial direction, wherein at least part of edges of the hexagonal carbon layers is exposed at the large ring ends by removing a deposited film of an excess amount of pyrolytic carbon formed during the vapor growth, wherein the catalytic metal is a fuel cell catalyst and is supported on the exposed edges of the hexagonal carbon layers, such that the catalyst is supported on more than one of the exposed edges, and wherein the stacked cup carbon nanofiber has a round cross-section.

2. The stacked cup carbon nanofiber for a fuel cell having catalytic metal supported thereon as defined in claim 1, wherein at least part of edges of the hexagonal carbon layers is exposed at the small ring ends by removing the deposited film formed during the vapor growth.

3. The stacked cup carbon nanofiber for a fuel cell having catalytic metal supported thereon as defined in claim 1, wherein the coaxial stacking morphology of the truncated conical tubular graphene layers has a shape of a hollow core with no bridge.

4. The stacked cup carbon nanofiber for a fuel cell having catalytic metal supported thereon as defined in claim 1, wherein an outer surface of the stacked cup carbon nanofiber is formed of the large ring ends stacked in the axial direction, and wherein exposed part of the edges of the hexagonal carbon layers has an area equal to or more than 2 percentages of an area of the outer surface.

5. The stacked cup carbon nanofiber for a fuel cell having catalytic metal supported thereon as defined in claim 4, wherein the outer surface includes a substantially smooth surface formed of the large ring ends positioned regularly, and wherein the catalytic metal is supported on the smooth surface.

6. The stacked cup carbon nanofiber for a fuel cell having catalytic metal supported thereon as defined in claim 4, wherein positions of the large ring ends forming the outer surface are irregular, and the outer surface has minute irregularity at the level of atoms, and wherein the catalytic metal is supported on the irregular outer surface.

7. The stacked cup carbon nanofiber for a fuel cell having catalytic metal supported thereon as defined in claim 6, wherein grooves are formed in the outer surface, and wherein the catalytic metal is supported in the grooves.

8. The stacked cup carbon nanofiber for a fuel cell having catalytic metal supported thereon as defined in claim 1, wherein an inner surface of the stacked cup carbon nanofiber is formed of the small ring ends stacked in the axial direction, wherein the inner surface includes a substantially smooth surface formed of the small ring ends positioned regularly, and wherein the catalytic metal is supported on the smooth surface.

9. The stacked cup carbon nanofiber for a fuel cell having catalytic metal supported thereon as defined in claim 1, wherein an inner surface of the stacked cup carbon nanofiber is formed of the small ring ends stacked in the axial direction, and wherein positions of the small ring ends forming the inner surface are irregular, and the inner surface has minute irregularity at the level of atoms, and wherein the catalytic metal is supported on the irregular inner surface.

10. The stacked cup carbon nanofiber for a fuel cell having catalytic metal supported thereon as defined in claim 9, wherein grooves are formed in the inner surface, and wherein the catalytic metal is supported in the grooves.

11. The stacked cup carbon nanofiber for a fuel cell having catalytic metal supported thereon as defined in claim 1, wherein the catalytic metal is at least one of platinum and platinum alloy.

12. The stacked cup carbon nanofiber for a fuel cell having catalytic metal supported thereon as defined in claim 1, wherein the catalytic metal is supported on multiple exposed edges.

13. A stacked cup carbon nanofiber for a fuel cell having catalytic metal supported thereon comprising a vapor grown coaxial stacking morphology of truncated conical tubular graphene layers, wherein each of the truncated conical tubular graphene layers includes a hexagonal carbon layer and has a large ring end at one end and a small ring end at the other end in an axial direction, wherein at least part of a deposited film of an excess amount of pyrolytic carbon formed during the vapor growth is removed from the large ring ends and the small ring ends, and edges of the hexagonal carbon layers are exposed, wherein the catalytic metal is a fuel cell catalyst and is supported on the exposed edges of the hexagonal carbon layers, and wherein the stacked cup carbon nanofiber has a round cross-section.

* * * * *